(12) United States Patent
Gorain et al.

(10) Patent No.: US 8,262,768 B2
(45) Date of Patent: Sep. 11, 2012

(54) METHOD TO IMPROVE RECOVERY OF GOLD FROM DOUBLE REFRACTORY GOLD ORES

(75) Inventors: Barun Gorain, Toronto (CA); Peter Kondos, Toronto (CA)

(73) Assignee: Barrick Gold Corporation, Toronto (CA)

( * ) Notice: Subject to any disclaimer, the term of this patent is extended or adjusted under 35 U.S.C. 154(b) by 411 days.

(21) Appl. No.: 12/208,985

(22) Filed: Sep. 11, 2008

(65) Prior Publication Data

US 2009/0071295 A1    Mar. 19, 2009

Related U.S. Application Data

(60) Provisional application No. 60/973,047, filed on Sep. 17, 2007.

(51) Int. Cl.
*C22B 11/00* (2006.01)
*C22B 9/00* (2006.01)

(52) U.S. Cl. ............................................ 75/710; 75/744

(58) Field of Classification Search .................... 75/744, 75/710; 423/26
See application file for complete search history.

(56) References Cited

U.S. PATENT DOCUMENTS

| | | |
|---|---|---|
| 3,796,308 A | 3/1974 | McIlhinney et al. |
| 3,799,334 A | 3/1974 | Collins |
| 3,819,363 A | 6/1974 | Wanzenberg |
| 3,968,032 A | 7/1976 | Menendez et al. |
| 4,058,897 A | 11/1977 | Edwards |
| 4,070,182 A | 1/1978 | Genik-Sas-Berezowsky et al. |
| 4,138,248 A | 2/1979 | Narain |
| 4,177,068 A | 12/1979 | Balakrishnan et al. |
| 4,269,622 A | 5/1981 | Kerley, Jr. |
| 4,270,609 A | 6/1981 | Choules |
| 4,314,890 A | 2/1982 | Beck et al. |
| 4,337,226 A | 6/1982 | Peasley et al. |
| 4,369,061 A | 1/1983 | Kerley, Jr. |
| 4,384,889 A | 5/1983 | Wiewiorowski et al. |
| 4,397,686 A | 8/1983 | Winkler et al. |
| 4,423,011 A | 12/1983 | Baglin et al. |
| 4,552,589 A | 11/1985 | Mason et al. |
| 4,566,772 A | 1/1986 | Sulesky et al. |
| 4,571,264 A | 2/1986 | Weir et al. |
| 4,585,561 A | 4/1986 | Zlokarnik et al. |
| 4,605,439 A | 8/1986 | Weir |
| 4,637,865 A | 1/1987 | Sergent et al. |
| 4,654,078 A | 3/1987 | Perez et al. |
| 4,654,079 A | 3/1987 | Nunez et al. |
| 4,723,998 A | 2/1988 | O'Neil |

(Continued)

FOREIGN PATENT DOCUMENTS

AU        199965466 A1    5/2000

(Continued)

OTHER PUBLICATIONS

NPL-1: G. Contini et al, Gas-phase Photoemission study of 2-mercaptobenzothiazole, J. Phys. Chem. A, 2002, vol. 106, pp. 2833-2837.*

(Continued)

*Primary Examiner* — Jie Yang
(74) *Attorney, Agent, or Firm* — Sheridan Ross P.C.

(57) ABSTRACT

The present invention is directed to a precious metal recovery process in which carbonaceous material, such as preg robbing carbon, is floated after sulfide oxidation to separate the carbonaceous material from the precious metal.

17 Claims, 2 Drawing Sheets

U.S. PATENT DOCUMENTS

| | | | |
|---|---|---|---|
| 4,738,718 | A | 4/1988 | Bakshani et al. |
| 4,765,827 | A | 8/1988 | Clough et al. |
| 4,786,323 | A | 11/1988 | Gock et al. |
| 4,801,329 | A | 1/1989 | Clough et al. |
| 4,816,235 | A | 3/1989 | Pesic |
| 4,867,868 | A | 9/1989 | Miller et al. |
| 4,902,345 | A | 2/1990 | Ball et al. |
| 4,911,804 | A | 3/1990 | Dickson |
| 4,919,715 | A | 4/1990 | Smith et al. |
| 4,923,510 | A | 5/1990 | Ramadorai et al. |
| 4,925,485 | A | 5/1990 | Schulze |
| 4,925,923 | A | 5/1990 | Yalpani et al. |
| 4,979,987 | A | 12/1990 | Mason et al. |
| 4,986,360 | A | 1/1991 | Laky et al. |
| 4,994,243 | A | 2/1991 | Goldstone et al. |
| 5,034,055 | A | 7/1991 | Rowson |
| 5,071,477 | A | 12/1991 | Thomas et al. |
| 5,078,977 | A | 1/1992 | Mudder et al. |
| 5,087,269 | A | 2/1992 | Cha et al. |
| 5,127,942 | A | 7/1992 | Brierley et al. |
| 5,215,575 | A | 6/1993 | Butler |
| 5,236,492 | A | 8/1993 | Shaw et al. |
| 5,244,493 | A | 9/1993 | Brierley et al. |
| 5,246,486 | A | 9/1993 | Brierley et al. |
| 5,254,153 | A | 10/1993 | Mudder |
| 5,262,048 | A | 11/1993 | Zimmerman et al. |
| 5,332,559 | A | 7/1994 | Brierley et al. |
| 5,354,359 | A | 10/1994 | Wan et al. |
| 5,364,453 | A | 11/1994 | Kohr |
| 5,364,605 | A | 11/1994 | Pfeffer et al. |
| 5,411,575 | A | 5/1995 | Fleming et al. |
| 5,423,991 | A | 6/1995 | Zimmerman et al. |
| 5,489,326 | A | 2/1996 | Thomas et al. |
| 5,536,297 | A | 7/1996 | Marchbank et al. |
| 5,536,480 | A | 7/1996 | Simmons |
| 5,626,647 | A | 5/1997 | Kohr |
| 5,629,137 | A | 5/1997 | Leedy |
| 5,645,708 | A | 7/1997 | Jones |
| 5,654,127 | A | 8/1997 | Leedy |
| 5,654,204 | A | 8/1997 | Anderson |
| 5,675,060 | A | 10/1997 | Benoist et al. |
| 5,725,995 | A | 3/1998 | Leedy |
| 5,743,936 | A | 4/1998 | Yokoyama et al. |
| 5,753,104 | A | 5/1998 | Hoecker et al. |
| 5,785,736 | A | 7/1998 | Thomas et al. |
| 5,834,294 | A | 11/1998 | Brierley et al. |
| 5,834,838 | A | 11/1998 | Anderson |
| 5,837,210 | A * | 11/1998 | Simmons et al. ............... 423/26 |
| 5,837,510 | A | 11/1998 | Goldsmith et al. |
| 5,851,499 | A | 12/1998 | Gathje et al. |
| 5,909,022 | A | 6/1999 | Bourke et al. |
| 5,917,116 | A | 6/1999 | Johnson et al. |
| 5,939,034 | A | 8/1999 | Virnig et al. |
| 5,968,364 | A | 10/1999 | Virnig et al. |
| 5,985,221 | A | 11/1999 | Knecht |
| 5,992,640 | A | 11/1999 | Clark et al. |
| 6,011,404 | A | 1/2000 | Ma et al. |
| 6,041,941 | A | 3/2000 | Newell et al. |
| 6,092,666 | A | 7/2000 | Clark et al. |
| 6,131,835 | A | 10/2000 | Johnson |
| 6,131,836 | A | 10/2000 | Johnson |
| 6,197,214 | B1 | 3/2001 | Virnig et al. |
| 6,200,545 | B1 | 3/2001 | Dreisinger |
| 6,210,648 | B1 | 4/2001 | Gathje et al. |
| 6,251,163 | B1 | 6/2001 | King |
| 6,260,549 | B1 | 7/2001 | Sosiak |
| 6,310,034 | B1 | 10/2001 | Woychik et al. |
| 6,318,361 | B1 | 11/2001 | Sosiak |
| 6,325,062 | B1 | 12/2001 | Sosiak |
| 6,383,458 | B1 | 5/2002 | Brierley et al. |
| 6,395,063 | B1 | 5/2002 | Cole |
| 6,414,509 | B1 | 7/2002 | Bhatt et al. |
| 6,425,392 | B1 | 7/2002 | Sosiak |
| 6,455,019 | B2 | 9/2002 | Jones |
| 6,471,743 | B1 | 10/2002 | Young et al. |
| 6,482,373 | B1 | 11/2002 | Hannaford et al. |
| 6,537,747 | B1 | 3/2003 | Mills, Jr. et al. |
| 6,574,130 | B2 | 6/2003 | Sega et al. |
| 6,576,041 | B2 | 6/2003 | Cole |
| 6,613,271 | B1 | 9/2003 | Lewis-Gray |
| 6,641,642 | B2 | 11/2003 | Simmons et al. |
| 6,643,165 | B2 | 11/2003 | Segal et al. |
| 6,647,250 | B1 | 11/2003 | Bultman et al. |
| 6,660,059 | B2 | 12/2003 | Ji et al. |
| 6,676,909 | B2 | 1/2004 | Marsden et al. |
| 6,679,383 | B2 | 1/2004 | Gathje et al. |
| 6,680,034 | B2 | 1/2004 | Marsden et al. |
| 6,696,283 | B1 | 2/2004 | Brierley et al. |
| 6,706,402 | B2 | 3/2004 | Rueckes et al. |
| 6,784,028 | B2 | 8/2004 | Rueckes et al. |
| 6,828,351 | B2 | 12/2004 | Epstein et al. |
| 6,835,591 | B2 | 12/2004 | Rueckes et al. |
| 6,836,424 | B2 | 12/2004 | Segal et al. |
| 6,846,841 | B2 | 1/2005 | Hunter et al. |
| 6,896,808 | B1 | 5/2005 | Jay |
| 6,911,682 | B2 | 6/2005 | Rueckes et al. |
| 6,919,592 | B2 | 7/2005 | Segal et al. |
| 6,942,921 | B2 | 9/2005 | Rueckes et al. |
| 6,953,120 | B2 | 10/2005 | Deveau et al. |
| 6,979,590 | B2 | 12/2005 | Rueckes et al. |
| 7,018,951 | B2 | 3/2006 | Gaffney et al. |
| 7,049,466 | B2 | 5/2006 | Bogan, Jr. et al. |
| 7,053,022 | B2 | 5/2006 | Gaffney et al. |
| 7,056,758 | B2 | 6/2006 | Segal et al. |
| 7,066,983 | B2 | 6/2006 | Ji et al. |
| 7,087,231 | B2 | 8/2006 | Guerin-Marchand et al. |
| 7,087,797 | B2 | 8/2006 | Sielcken et al. |
| 7,120,047 | B2 | 10/2006 | Segal et al. |
| 7,125,436 | B2 | 10/2006 | Marsden et al. |
| 7,176,505 | B2 | 2/2007 | Rueckes et al. |
| 7,219,804 | B2 | 5/2007 | Simmons et al. |
| 7,229,560 | B2 | 6/2007 | Rink et al. |
| 7,244,769 | B2 | 7/2007 | Epstein et al. |
| 7,341,700 | B2 | 3/2008 | Marsden et al. |
| 7,387,767 | B2 | 6/2008 | Campbell et al. |
| 7,488,370 | B2 | 2/2009 | Hourn et al. |
| 2003/0075021 | A1 | 4/2003 | Young et al. |
| 2003/0104400 | A1 | 6/2003 | Ruben et al. |
| 2006/0133974 | A1 | 6/2006 | Ji et al. |
| 2006/0142634 | A1 | 6/2006 | Anstadt et al. |
| 2006/0234260 | A1 | 10/2006 | Griffais et al. |
| 2009/0071295 | A1 | 3/2009 | Gorain et al. |
| 2009/0071296 | A1 | 3/2009 | Hillier et al. |

FOREIGN PATENT DOCUMENTS

| | | |
|---|---|---|
| CA | 2070087 | 12/1992 |
| CA | 2095307 | 4/1993 |
| CA | 2129819 | 8/1993 |
| CA | 2138618 | 7/1995 |
| CA | 2264865 | 4/1998 |
| CA | 2321703 | 9/1999 |
| CA | 2349940 | 3/2000 |
| CA | 2363031 | 8/2000 |
| CA | 2278043 | 1/2001 |
| CA | 2278044 | 1/2001 |
| CA | 2417417 | 1/2002 |
| CA | 2504934 | 5/2004 |
| CA | 2272037 | 7/2009 |
| CN | 86101940 | 4/1987 |
| CN | 1052903 | 7/1991 |
| CN | 1253845 | 5/2000 |
| CN | 2405636 | 11/2000 |
| CN | 1544169 | 11/2004 |
| CN | 1800421 | 7/2006 |
| CN | 1800423 | 7/2006 |
| DE | 3036848 | 4/1982 |
| EP | 0614089 | 9/1994 |
| EP | 0686206 | 5/1995 |
| EP | 1441048 | 7/2004 |
| GR | 1001483 | 2/1994 |
| KR | 2050046 | 6/2002 |
| KR | 2077054 | 10/2002 |
| KR | 20030041841 | 5/2003 |
| KR | 5002690 | 1/2005 |
| MX | 3000745 | 11/2004 |
| NZ | 506858 | 9/2002 |
| RU | 1478451 | 11/1994 |

| | | |
|---|---|---|
| RU | 2023729 | 11/1994 |
| RU | 2044573 | 9/1995 |
| RU | 2104321 | 2/1998 |
| RU | 2135297 | 8/1999 |
| RU | 2293821 | 2/2007 |
| TW | 528732 | 4/2003 |
| WO | WO 91/11539 | 8/1991 |
| WO | WO 95/12001 | 5/1995 |
| WO | WO 95/32285 | 11/1995 |
| WO | WO 96/19593 | 6/1996 |
| WO | WO 99/47714 | 9/1999 |
| WO | WO 00/48944 | 8/2000 |
| WO | WO 00/65112 | 11/2000 |
| WO | WO 01/69862 | 9/2001 |
| WO | WO 02/08475 | 1/2002 |
| WO | WO 03/089677 | 10/2003 |
| WO | WO 2004/042094 | 5/2004 |
| WO | WO 2004/067751 | 8/2004 |
| WO | WO 2004/069166 | 8/2004 |

OTHER PUBLICATIONS

Translation of Official Action for Pakistan Patent Application No. 1095/2008.

Dreisinger, "New Developments in Cu and Ni Hydrometallurgy, Presentation to JOGMEC (Japan)", pp. 1-120, Feb. 2006, University of British Columbia.

Kamberovic, et al., "On the Physicochemical Problems of Aqueous Oxidation of Polymetalic Gold Bearing Sulphide Ore in an Autoclave", 37 (2003) pp. 107-114.

"Metallurgical Process Simulation—An Inside Look", Delivering Smarter Solutions, pp. 1-4, May 2003, Issue No. 42.

Cadzow, et al., "Macraes Gold Project: Value creation through applied technology—Pressure oxidation", 2000 New Zealand Minerals & Mining Conference Proceedings, Oct. 29-31, 2000, 7 pages.

Dreisinger, "The Application of the Platsol™ Process to Copper-Nickel-Cobalt-PGE/PGM Concentrates from Polymet Mining's Northmet Deposit", Presentation, ALTA 2005, 16 pages, 52 slides.

Zhang, "Oxidation of Refractory Gold Concentrates and Simutaneous Dissolution of Gold in Aerated Akaline Solutions", pp. 1-358, Mar. 2004, Murdoch University, Perth, Australia.

Chen et al., "Characterizing gold in refractory sulfide gold ores and residues", Minerals, Metals & Materials Society, Dec. 2002, pp. 1-3, http://findarticles.com/p/articles/mi_qa5348/is_200212/ai_n21322176.

Anderson, "Alkaline Sulfide Recovery of Gold Utilizing Nitrogen Species Catalyzed Pressure Leaching", Aug. 1, 2003, pp. 75-88, The Center for Advanced Mineral and Metallurgical Processing, Montana Tech, Butte, Montana.

Atluri; "Recovery of Gold and Silver from Ammoniacal Thisulfate Solutions Containing Copper by Resin Ion Exchange Method"; Thesis Submitted to the Faculty of the Department of Materials Science and Engineering (University of Arizona); 1987.

Agadzhanyan et al.; "Kinetics of Ion Exchange in Selcetive Systems, II. Kinetics of the Exchange of Differently Charged Ions in a Macroporous Ion Exchanger"; Russian Journal of Physical Chemistry; vol. 61; 1987; pp. 994-997.

Marcus; "The Anion Exchange of Metal Complexes—The Silver—Thiosulphate System"; ACTA Chemica Scandinavica II; 1957; pp. 619-627.

Gallagher, et al., Hydrometallurgy; Affinity of activated carbon towards some gold (I) complexes; Hydrometallurgy, 25 (1990) 305-316, Amsterdam.

Langhans, et al., Hydrometallurgy; Copper-catalyzed thiosulfae leaching of lowgrade gold ores; Hydrometallurgy, 29 (1992) 191-203, Amsterdam.

International Search Report for International (PCT) Application No. PCT/IB2008/003591, mailed Apr. 21 2009.

Written Opinion for International Application No. PCT/IB2008/003591, mailed Apr. 21, 2009.

International Preliminary Report on Patentability for International (PCT) Patent Application No. PCT/IB2008/003591, mailed Mar. 31, 2011 7 pages.

"Blue Ridge Platinum Concentrator handed over," Bateman Globe 78, 4th Quarter, 2009, pp. 6-7.

"Depramin® in Flotation", available at http://www.cs.akzonobel.com/Products/Depramin/inFlotation/, as early as Nov. 15, 2004, p. 1, printed on Aug. 18, 2007.

"Positive Results for Initial Metallurgical Testwork from the Akanani Platinum Project," Press Release—Afriore Limited, Jun. 28, 2006, pp. 1-2.

Bourke, "Flash Flotation of Copper and Gold", Microsoft PowerPoint—OutputV3 international, Issue 3, Sep. 2002, pp. 7-11, available at ttp://64.233.167.104/search?q=cache:qRzNN7-cECcJ:www.outec.com/files/Technology/Docunnents/newsletters/Output3_int . . . , printed on Aug. 18, 2007.

King, "Audit the Hidden Costs of Inefficient Thickness", Microsoft PowerPoint—OutputV3 international, Issue 3, Sep. 2002, pp. 12-17, available at ttp://64.233.167.104/search?q=cache:qRzNN7-cECcJ:www.outec.com/files/Technology/Documents/newsletters/Output3_int . . . , printed on Aug. 18, 2007.

Okley, "Collaborative Research: how should it sharpen your own competitive edge?", Microsoft PowerPoint—OutputV3 international, Issue 3, Sep. 2002, pp. 1-6, available at http://64.233.167.104/search?q=cache:qRzNN7- cECcJ:www.outec.com/files/Technology/Documents/newsletters/Output3_int . . . , printed on Aug. 18, 2007.

Pyke, B.L. et al., "The Characterisation and Behavior of Carbonaceous Material in a Refractory Gold Bearing Ore," Minerals Engineering, 1999, vol. 12, No. 8, pp. 851-862.

Wills, Mineral Processing Technology: An Introduction to the Practical Aspects of Ore Treatment and Mineral Recovery, 1979, vol. 29, Chapter 12, pp. 276-337.

Yan, et al., "Predicting the Performance of a Flotation Circuit that Incorporates Flash Flotation", Conference Proceeding—Centenary of Flotation Symposium, 2005, available at http://www.shop.ausimm.com.au/paperdetails.php?PaperID=1914, pp. 1-2, printed on Aug. 18, 2007 (Abstract Only).

Official Action for Eurasion Patent Application No. 2010 00 479, dated Aug. 9, 2011.

Official Action including English summary for Dominican Republic Application No. P2010-0081, Mar. 13, 2012.

\* cited by examiner

METHOD TO IMPROVE RECOVERY OF GOLD FROM DOUBLE REFRACTORY GOLD ORES

CROSS REFERENCE TO RELATED APPLICATION

The present application claims the benefits of U.S. Provisional Application Ser. No. 60/973,047, filed Sep. 17, 2007, of the same title, which is incorporated herein by this reference in its entirety.

FIELD

The invention relates generally to recovery of gold and/or silver and particularly to recovery of gold from refractory and double refractory materials.

BACKGROUND

Many precious metal deposits currently processed throughout the world are sulfidic in nature, and present challenges in the extraction and recovery of the contained gold. These deposits are not amenable to gold recovery by direct cyanidation as the gold is finely disseminated in the sulfide mineral crystal structure or as a solid solution that may be inaccessible to lixiviants. The cost of size reduction required to liberate the sulfide refractory gold is often prohibitive, and, in the case of gold disseminated as a solid solution, ineffective.

The preferred treatment, to liberate the gold is to oxidize the sulfides. Common methods of oxidation include bio-oxidation, roasting, atmospheric leaching, alkaline pressure oxidation (as in the process disclosed in Mason et al., U.S. Pat. No. 4,552,589), or acidic pressure oxidation (as disclosed in Thomas et al. U.S. Pat. No. 5,071,477). Roasting may not be suitable or economical for ores that contain low levels of sulfide and high levels of carbonates, because the roasting temperature cannot be maintained by the heat of the reaction.

In addition to the sulfide refractory nature of gold deposits, ores may also contain an active carbonaceous component, which has the ability to adsorb, or preg-rob, gold from the cyanide leach solutions thereby reducing recovery. This adsorption affinity of carbonaceous material forms the basis of the Carbon in Leach (CIL) and Carbon in Pulp (CIP) processes, which employ activated carbon granules to recover gold from gold cyanide solutions. The size and ruggedness of these commercially produced granules are such that they can be easily separated from the leach or pulp after adsorption has occurred by screening. Indigenous carbon competes with the commercially supplied graphite for the adsorption of gold, and is too small to be selectively removed by screening, and, therefore, the gold the indigenous carbon adsorbs is not recovered. An additional problem in recovering gold from highly carbonaceous ores is that a significant quantity of the gold may have been adsorbed onto carbon during formation of the mineral deposit. Cyanide has shown varying degrees of success in leaching gold locked in carbonaceous material.

Several strategies have been developed to reduce the preg-robbing.

The addition of blanking agents such as Kerosene, fuel oil, and RV-2 (para nitro benzol azo salicylic acid) selectively adsorb onto the surface of activated carbon in carbonaceous ores, thereby deactivating some of the preg-robbing character.

Carbonaceous matter can also be destroyed by roasting. This is the current industry standard for simultaneously destroying carbonaceous matter and oxidizing the sulfide minerals in refractory carbonaceous gold ores. This process is generally, but not always, successful and will depend upon the roasting temperature. Very high temperatures are often required to combust the graphitic carbon. Roasting plants operate in a narrow range of temperature tolerance. Below optimum temperature, the carbon in the ore is not oxidized and remains actively preg-robbing. Above the optimum temperature, the gold in the ore becomes increasingly less amenable to cyanidation or other extraction techniques.

In some cases, pressure oxidation can partially deactivate the indigenous carbon, but is not sufficient for highly preg-robbing ores. Processes such as that described in U.S. Pat. No. 5,364,453 employ flotation in which native and supplied carbon of cyanide leach residues are recovered by flotation. A disadvantage of this method is the size differential between the native carbon and commercial carbon. This would result in poor flotation behavior of the fine carbon.

Flotation of the carbonaceous component of double refractory ores prior to sulfide oxidation has proven to be inefficient, because ultra fine grinding is required to effectively separate the carbonaceous material from sulfide grains. Ultra fine grinding adds to the overall process costs and, depending on the ore's mineralogy, may not be fully effective at liberating the carbonaceous component from the gold bearing sulfides. In low grade ores, the loss of the gold containing sulfide to the carbonaceous flotation concentrate would significantly degrade the grade of the feed material to a hydrometallurgical or bacterial oxidation process.

SUMMARY

These and other needs are addressed by the various embodiments and configurations of the present invention. The invention is directed generally to treatment of refractory and double refractory precious metal materials by oxidizing a portion of the sulfide sulfur followed by selective flotation to separate the carbonaceous material from precious metal sulfides.

Sulfide sulfur can be oxidized by any suitable process including pressure oxidation, bio-oxidation, and roasting.

Either direct or reverse flotation techniques can be employed. In direct flotation, the precious metal sulfides and sulfates are concentrated in the concentrate and the carbonaceous material in the tails. In reverse flotation, the precious metal sulfides and sulfates are concentrated in the tails and the carbonaceous material in the concentrate.

The present invention can provide a number of advantages depending on the particular configuration. Performing flotation of carbonaceous material after sulfide oxidation can reduce the material's flotation behavior. The oxidation process can improve the liberation of carbonaceous matter encapsulated by sulfides. Both sulfide oxidation and better liberation can assist in better flotation selectivity of carbonaceous matter, thereby reducing the gold losses in the carbon tails (for direct flotation) or concentrate (for reverse flotation). Removal of the carbonaceous matter (TCM) can improve the leaching behavior of the leach residue. Since the TCM concentrate has a low mass pull with heat value, gold recovery can be further improved by burning the TCM concentrate in a separate process and leaching the residue. Removal of TCM from unoxidized, double refractory ores has been problematic due to significant gold losses in the TCM concentrate, which renders such removal impractical. Removing TCM from oxidized sulfide products can circumvent such gold losses and reduce the preg robbing behavior of the ores.

These and other advantages will be apparent from the disclosure of the invention(s) contained herein.

As used herein, "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "carbonaceous" refers to organic carbon-containing. Examples of organic carbonaceous materials include humic acid, hydrocarbons, and activated carbon.

As used herein, "inorganic carbon" refers primarily to the metallic carbonates, such as calcium carbonate and sodium carbonate, and to binary compounds of carbon such as carbon oxides, carbides, carbon disulfides, etc., ternary compounds, such as metallic cyanides, metallic carbonyls, carbonyl sulfides, etc.

As used herein, "Total Carbonaceous Material" or TCM, includes only organic carbon and excludes inorganic carbon.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present invention(s). These drawings, together with the description, explain the principles of the invention(s). The drawings simply illustrate preferred and alternative examples of how the invention(s) can be made and used and are not to be construed as limiting the invention(s) to only the illustrated and described examples. Further features and advantages will become apparent from the following, more detailed, description of the various embodiments of the invention(s), as illustrated by the drawings referenced below.

DETAILED DESCRIPTION

An embodiment will be discussed with reference to FIGS. 1A and 1B.

Figure 1A:
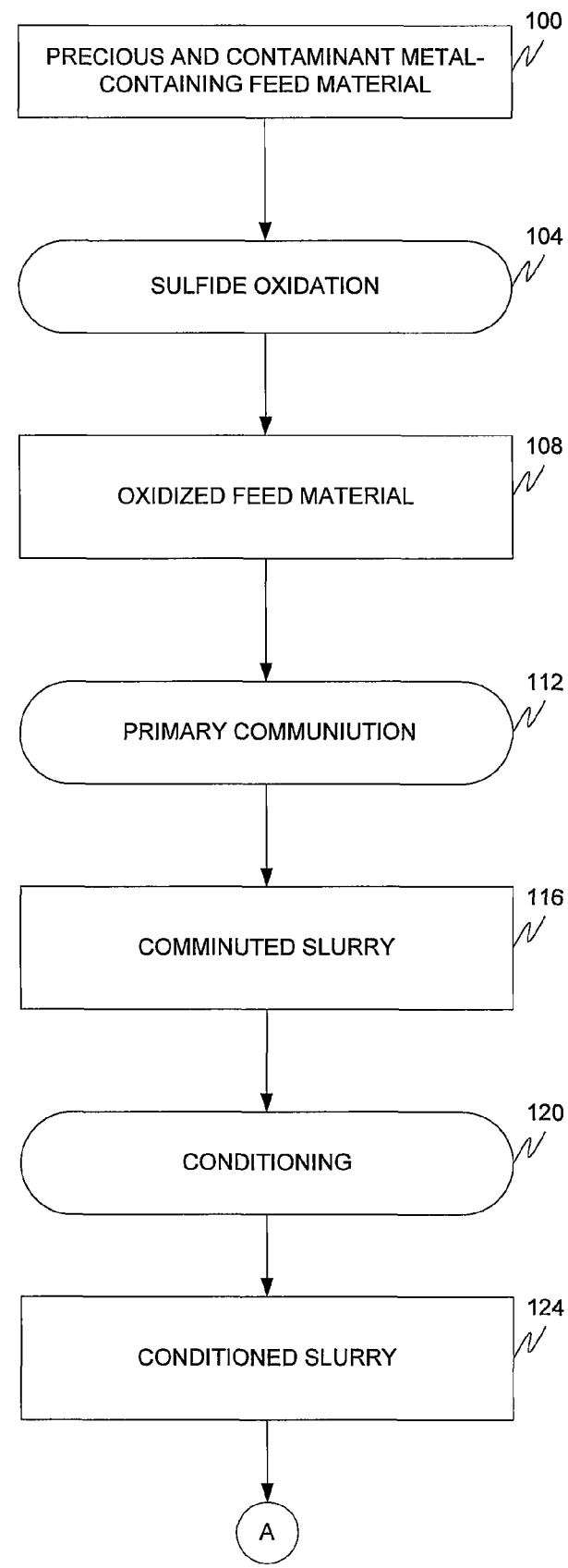
FIGS. 1A and 1B depict a process according to an embodiment.

Referring to FIG. 1A, the feed material 100 is a mineralized, gold and/or silver-bearing material, such as ore, concentrate, and tailings. The feed material 100 includes at least about 0.1 wt. % sulfide sulfur and even more preferably from about 0.5 to about 15 wt. % sulfide sulfur, at least about 0.05 oz/tonne and even more commonly from about 0.2 to about 2.0 oz/tonne gold, and at least about 1 oz/tonne and even more commonly from about 1 to about 5 oz/tonne silver. Sulfide minerals in the feed material 100 commonly include pyrite, marcasite, arsenopyrite, and chalcopyrite. The feed material 100 commonly has no more than about 1.0 oz/tonne and even more commonly no more than about 0.1 oz/tonne platinum group metals.

The feed material 100 can further include carbon-containing materials, such as inorganic carbon-containing materials (e.g., the carbonates ankerite, calcite, siderite, and dolomite) and carbonaceous materials (e.g., humic acid, hydrocarbons, and activated carbon). Carbonaceous materials are frequently preg robbing. Generally, the amount of carbonaceous material is determined as the total amount of carbon in the material 100, except that which is present as inorganic carbon. Typically, the material 100 includes from about 0.1 to about 30 wt. % inorganic carbon and from about 0.3 to about 10 wt. % organic carbon-containing materials.

The size distribution of the feed material 100 depends on the process to be used for sulfide oxidation (step 104). For acid or alkaline pressure oxidation and tank bio-oxidation for example, the material preferably has a $P_{80}$ size of no more than about 100 microns (200 mesh (Tyler)) and even more preferably of no more than about 75 microns. For heap leaching, the material preferably has a $P_{80}$ size of no more than about 1 inch and even more preferably ranging from about 0.25 to about 0.5 inches. As will be appreciated, the particles of material may be agglomerated. For roasting, the material preferably has a $P_{80}$ size of no more than about 250 microns and even more preferably ranging from about 100 to about 200 microns.

In step 104, the feed material 100 is subjected to a process to oxidize sulfides, particularly arsenopyrite (FeAsS) and pyrite (FeS). Any of a number of sulfide oxidation processes can be employed. Commonly, sulfide oxidation processes are chemical, biological, or thermal in nature.

In a common chemical oxidation process, the feed material 100 is subjected to pressure oxidation ("POX"), under acid or alkaline conditions, in an autoclave. In acid POX, the sulfide sulfur is believed to be converted into sulfate sulfur primarily by one or more of the following reactions:

$$FeS_2 + 7/2 O_2 + H_2O = FeSO_4 + H_2SO_4 \qquad (1)$$

$$2FeAsS + 13/2 O_2 + 2H_2O = 2H_3AsO_4 + 2FeSO_4 \qquad (2)$$

$$FeAsS + 5O_2 + 2H_2O = FeAsO_4 + 2H_2SO_4 \qquad (3)$$

Acid POX is normally conducted at a molecular oxygen pressure of at least about 1 MPa, at a pH ranging from about pH 2 to about pH 4, and at a temperature ranging from about 200 to about 230 degrees Celsius. In alkaline POX, the sulfide sulfur is believed to be converted into sulfate sulfur primarily by one or more of the following reactions:

$$42FeS_2 + 16OH^{31} + 15O_2 = 4Fe(OH)_3 + 8SO_4^{2-} + 2H_2O \qquad (4)$$

$$2FeAsS + 10OH^- + 7O_2 = Fe_2O_3 + 2AsO_4^{3-} + 2SO_4^{2-} + 5H_2O \qquad (5)$$

Alkaline POX is normally conducted at a molecular oxygen pressure of at least about 1 MPa, at a pH ranging from about pH 8 to about pH 11, and at a temperature ranging from about 175 to about 230 degrees Celsius.

In a common bio-oxidation process, the feed material 100, is placed in a stirred tank reactor or heap and inoculated with a microbial consortium. Examples of sulfide ingesting microbes include *thiobacillus ferroxidans, thiobacillus thiooxidans, thiobacillus organoparus, thiobacillus acidophilus, leptospirillum ferroxidans, sulfobacillus thermosulfidooxidans, sulfolobus acidocaldarius, sulfolobus BC, sulfolobus solfataricus,* and *acidianus brierleyi*. The material 100 is periodically contacted with a solution comprising microbial nutrients, which commonly are $Fe^{3+}$, $(NH_4)_2SO_4$, and $PO_4^{3-}$. The temperature of the material 100 depends on the microbes selected. Typically, the temperature ranges from ambient to about 80 degrees Celsius. The pressure is commonly atmospheric and the pH is preferably no more than about pH 4 and more preferably ranges from about pH 1.5 to about pH 2. The microbes ingest the sulfide and produce sulfate sulfur.

In a thermal oxidation process, the feed material 100 is roasted in a fixed or fluidized bed reactor and contacted with a molecular oxygen-containing gas. In roasting, the sulfide sulfur is believed to be converted into sulfate sulfur primarily by one or more of the following reactions:

$$2FeS_2 + 11/2O_2 = Fe_2O_3 + 4SO_2 \qquad (6)$$

$$2FeAsS + 5O_2 = Fe_2O_3 + As_2O_3 + 2SO_2 \qquad (7)$$

The temperature of the bed typically ranges from about 500 to about 700 degrees Celsius. As can be seen from the above equations, the sulfur is removed from the material 100 as sulfur dioxide gas. Although carbonaceous material can, at proper bed temperatures, be destroyed substantially, roasting has had varying degrees of success in such destruction and, using the process described herein, can be operated at lower bed temperatures, as a substantial fraction of the remaining carbonaceous material can be floated selected and separated from gold and/or silver-containing sulfides.

In any of the above processes, most, and even more commonly at least about 90% of the gold and/or silver and carbonaceous materials remain in the oxidized material 108. Typically, at least about 50%, more typically at least about 70%, and even more typically at least about 80% of the sulfide sulfur content of the material 100 is oxidized during sulfide oxidation. The sulfide content of the oxidized feed material 108 typically is no more than about 15 wt. %, even more typically no more than about 10 wt. %, and even more typically ranges from about 0.5 wt. % to about 5 wt. %. For POX, the total sulfur content of the oxidized feed material 108 commonly ranges from about 0.5 wt % to about 5 wt. %.

In step 112, the oxidized feed material 108 is comminuted to produce a size distribution sufficient to liberate coarsely sized carbonaceous material and remove any oxidative film from the particle surfaces and expose new surfaces. The minimum liberation size for the carbonaceous material in the oxidized feed material 108 depends on ore type, an understanding of the ore liberation and solution chemistry of the ore, and power and media costs. The optimal liberation size and the grind sizes in the primary and secondary comminution stages are selected to reduce over grinding (or sliming). Over grinding can slow down flotation kinetics, waste grinding power, and lead to dissolution of metal ions in solution. Preferably, primary comminution and size separation are performed to provide a $P_{80}$ size of the feed material to primary rougher flotation ranging from about 100 to about 200 microns, even more preferably from about 120 to about 175 microns, and even more preferably from about 140 to about 150 microns.

Comminution may be performed in a crusher, a primary (wet) mill and, in an open or closed milling circuit, size separated, such as by using a cyclone, with the oversized comminuted slurry (or underflow) being returned to step 112 and the undersized comminuted slurry (or overflow) 116 being forwarded to the conditioning step 120 prior to rougher flotation.

In conditioning step 120, various reagents are contacted with the comminuted slurry 116 to provide a desired flotation chemistry. The reagents include collectors, regulators, depressants, pH adjustors, dispersants, sodium carbonate, and frothers.

Collectors are organic surfactants that render sulfide minerals water-repellant, or hydrophobic to such a level that attachment of the particle to the bubble can be made on contact. Preferably, the collector renders the carbonaceous material more hydrophobic. Exemplary collectors include fuel oil, kerosene and collectors tailored for carbon, such as carbon collector S19979/S10037 manufactured by Cytec and other flotation chemical reagent companies. The collector dosage preferably ranges from about 50 to about 600 g/tonne of solid particles in the flotation feed, depending on the ore type.

Depressants increase the selectivity of flotation by rendering selected minerals hydrophilic, thus preventing their flotation. Because the precious metal-containing particles are to remain in the tails, it is desirable to depress their flotation. Because the gold and/or silver will be closely associated with sulfide or sulphate sulfur, it is desirable to depress the flotation of unreacted sulfides and sulphates. Suitable depressants include, for example, high pH, sodium cyanide, SD200 manufactured by Charles Tennant and Co., and Cytec polymeric depressants Aero 9583 with sodium hypochlorite (NaOCl). The amount of regulator (whether as activator or depressant) added typically ranges from about 0 to about 500 g/tonne.

pH adjustment of the comminuted slurry 116 may be required using an acid or base as appropriate. The preferred flotation pH ranges from about pH 4.0 to about pH 12.0 and even more preferably from about pH 5 to about pH 9. Once the pH is adjusted in comminution step 112, the pH does not commonly require further adjustment during rougher flotation.

Some ores contain significant amounts of clays and slimes and require addition of a dispersant during primary comminution. A preferred dispersant is sold under the tradename Cyquest E-40™ (also known as Cyanamer P-80™). This dispersant is a low molecular weight polymer known to be tolerant to multivalent ions (Ca, Mg, Fe, Al, etc.) and substantially insensitive to water chemistry and acts as a sequestering agent and anti-scalant. The amount of dispersing agent depends of course on ore type but typically ranges from about 50 g/tonne to about 300 g/tonne of solid particles.

Where the process water has high levels (e.g., a saturated level) of dissolved gypsum it is desirable to add sodium carbonates (e.g., soda ash) to help clean the exposed mineral surfaces of precipitated gypsum. Preferably, the amount of soda ash added during comminution or flotation feed conditioning ranges from about 25 g/t to about 1000 g/t of solid particles.

The frother adds stability to the air bubbles. Preferably, the frother is a heteropolar surface-active organic reagent including a hydroxyl, carboxyl, carbonyl, amino or sulpho functional group. Alcohol-based frothers are preferred, with a mixture of MethylIsobutyl Carbinal (MIBC) and a stronger glycol-based frother sold under the tradename Cytec F549™ being even more preferred. Examples of other frothers include Dowfroth 250 (polypropylene glycol methyl ether) manufactured by Dow Chemical and Aerofroth 88 manufactured by American Cyanamid Colo. The frother dosage preferably ranges from about 25 g/tonne to about 200 g/tonne of solid particles, depending on ore types and water quality.

The conditioned slurry 124, or flotation pulp, preferably ranges from about 15 to about 40% solids by weight and even more preferably from about 15 to about 35% solids by weight.

The order of addition of the various reagents can be important. Dispersants, particularly Cyquest E-40™ are acidic and can lead to evolution of $CO_2$ when mixed with soda ash, thereby rendering much of the soda ash useless. The preferred method is to put the dispersant and soda ash in the mill separately or neutralize Cyquest E-40™ with NaOH to a pH of about pH 10 to 11 and then mix the neutralized dispersant with soda ash. The mixture is then added to the primary mill or flotation feed conditioning system. The collector is typically added to the slurry 116 and conditioned for a time ranging from about 1 to 5 minutes depending on the ore type. Normally, the frother is added last since it does not react chemically, only requires dispersion in the pulp, and does not need long conditioning times.

In step 120, the undersized comminuted slurry 116 is conditioned in a suitable vessel prior to rougher flotation. In flotation, the amount of agitation and consequent dispersion are closely associated with the time required for physical and chemical reactions to take place. While the reagents can be added during grinding, disadvantages of adding all reagents in the mill include reagent interactions that consume reagents needlessly and a difficulty in controlling reagent addition rates. Conditioning before flotation can decrease flotation time. In complex ores requiring close control of conditioning time, separate conditioning tanks are normally employed.

In the rougher flotation circuit (step 128), the conditioned slurry is floated in a bank, or series, of flotation machines. The flotation machines can be aerated flotation cells or columns. Rougher flotation 128 may include one or more stages, depending on the application. In rougher flotation, preferably no less than about 25%, even more preferably no less than about 30%, and even more preferably no less than about 40% of the carbonaceous material and no more than about 40%, even more preferably no more than about 35%, and even more preferably no more than about 20% of the gold and/or silver is removed in the rougher concentrate 132. The rougher flotation tails 136 commonly include most and even more commonly at least about 60% of the gold and/or silver and less than about 50% and even more commonly no more than about 40% of the carbonaceous material in the material 100.

In step 140, the rougher concentrate fraction 132 is further comminuted, or reground, to a finer size. Preferably, secondary comminution and size separation (preferably by a cyclone) are performed to provide a $P_{80}$ size of the reground concentrate 144 ranging from about 25 to about 100 microns, even more preferably from about 35 to about 75 microns, and even more preferably from about 40 to about 60 microns.

In the secondary mill, the same additives added in the primary mill may be contacted with the rougher concentrate fraction 132, with the dosages depending on ore types and target metallurgy. Generally, the cumulative amounts added are less due to the lesser volume (tonnage) of the concentrate fraction and residual concentrations of reagents. A pH adjustor may be again added to adjust the pH to the levels noted previously and the density of the concentrate fraction adjusted to the range noted above.

The reground concentrate 144 is conditioned in step 148. In the conditioning step, the same additives added in the prior conditioning step 120 may be added, with the dosages depending on ore types and target metallurgy. Generally, the cumulative amounts added are less due to the lesser volume (tonnage) of the concentrate fraction and the presence of residual concentrations of reagents from the rougher flotation circuit.

The conditioned concentrate 152 is subjected to flotation in a cleaner flotation circuit 156. Compared to the rougher flotation circuit, the cleaner flotation circuit has lower froth depth due to higher tailings overflow weirs. In cleaner flotation, preferably no less than about 40%, even more preferably no less than about 50%, and even more preferably no less than about 60% of the carbonaceous material in the rougher flotation concentrate 132 and no more than about 80%, even more preferably no more than about 75%, and even more preferably no more than about 70% of the gold and/or silver in the rougher flotation concentrate 132 are removed in the cleaner flotation concentrate 160. The cleaner flotation tails 164 commonly include at least about 20% of the gold and/or silver in the rougher flotation concentrate 132 and no more than about 35% and even more commonly no more than about 40% of the carbonaceous material in the rougher flotation concentrate 132. Preferably, the cleaner concentrate 160 includes about 50% or more, and even more preferably at least about 60% or more, of the carbonaceous material and no more than about 80%, and even more preferably no more than about 75%, of the gold and/or silver in the material 100. Collectively, the rougher and cleaner flotation tails 136 and 164 preferably comprise at least about 70%, even more preferably at least about 80%, and even more preferably at least about 90% of the gold and/or silver in the material 100.

As will be appreciated, flotation of the carbonaceous material as a concentrate can be performed using any suitable flotation circuit. For example, the above flotation circuits can include multiple rougher flotation stages, multiple cleaner flotation stages, one or more scavenger flotation stages, and/or one or more flash flotation stages.

The rougher and cleaner flotation tails 136 and 164 are subjected to precious metal recovery step 168 to provide a precious metal product 172. Any suitable techniques can be used to recover the gold and/or silver. Generally, the tails, if not already at an alkaline pH, are neutralized and leached with cyanide, thiosulfate, or thiourea to dissolve the gold in the lixiviant. The dissolved gold and/or silver is adsorbed by a sorbent, such as an organic resin or carbon. Precious metal dissolution and adsorption can be performed simultaneously, or in a common vessel, using a technique, such as Carbon-In-Leach (CIL), Carbon-In-Pulp (CIP) or Resin-In-Leach (RIL). The precious metal is then stripped from the sorbent. This is typically done using a mineral acid (with nitric acid being preferred) to remove calcium ions followed by contact with an eluant in the form of a 1% caustic solution. The barren sorbent can be thermally regenerated and reused. The dissolved precious metal is recovered from the precious metal-loaded eluant using known techniques to form the precious metal product 194 of high purity. When cyanide is employed as the lixiviant, the waste residue 195 is subjected to cyanide detoxification, such as by sulfur dioxide/air or contact with Caro's acid.

In another embodiment, direct flotation, rather than reverse flotation, can be employed. In direct flotation, the flotation conditions are selected to float the precious metal-containing materials in the concentrate, thereby concentrating the carbonaceous material in the tails. The rougher flotation tails would then be reground, if necessary, and subjected to cleaner flotation to remove any gold or silver remaining in the tails. The various reagents are known to those skilled in the art. An activator, such as soluble metal salts (with transition metal salts being preferred, copper and lead salts being even more preferred and copper sulfate and lead nitrate being even more preferred) can be added to promote flotation of the precious metal-containing material, and a depressant to inhibit flotation of the carbonaceous material. Any suitable carbon depressant can be employed. Suitable carbon depressants include sulfonates (e.g., sodium naphthalene sulfonate), and depressants manufactured under the tradenames Depramin by Akzo Nobel and Cytec 633™. The carbon depressant is preferably added to the slurry after pH adjustment. Depressant dosage is carefully controlled as high dosages can lead to depression of sulfide and sulfate sulfur flotation and low dosages can be ineffective in depressing carbon particles. The depressant dosage preferably ranges from about 1 g/tonne to about 50 g/tonne of solid particles depending on the carbon content in the undersized comminuted slurry 116.

Direct flotation is more suitable when a sulfide concentrate with 7% or higher sulfide content is required for autogenous pressure oxidation or roasting. This may be a more economic scenario than oxidizing whole ore as flotation concentrate allows oxidation of only about 10 to 40% of the plant feed. This also might mean losses of gold and/or silver to flotation tailings. Economic analysis is typically required to justify a direct flotation process.

EXPERIMENTAL

The following examples are provided to illustrate certain embodiments of the invention and are not to be construed as limitations on the invention, as set forth in the appended claims. All parts and percentages are by weight unless otherwise specified.

Example 1

Acid POX and CIL

A gold bearing sulfide ore is ground to $P_{80}$ less than 70 microns. The ore was pre-acidified to remove the carbonate components prior to acid Pressure Oxidation (POX), at 225° C. with oxygen over pressure of 100 psi, a pulp density of 30% and a residence time of 1 hour. The percent sulfide oxidation was typically 97% and the residue discharged from the autoclave contained less than 0.06% sulfide. The autoclave discharge also contained 0.49% Total Carbonaceous Material or TCM, a portion of which contributes to the phenomenon of preg robbing.

The pH of the discharge slurry was adjusted to greater than pH 10.5 with lime, and gold recovery was performed using cyanidation and Carbon in Leach ("CIL"). Treatment of the discharge by conventional CIL yielded a gold recovery of about 55%. This example illustrates low gold recovery caused by the preg-robbing character imparted by a portion of the TCM material. The feed assays and CIL recoveries are summarized in Table 1.

TABLE 1

| Elements | | Head Assay BR31 | Acid POX Discharge |
|---|---|---|---|
| Au | g/t | 5.05 | 5.31 |
| S (T) | % | 2.09 | |
| $S^{2-}$ | % | 1.60 | 0.02 |
| TCM | % | 0.46 | 0.49 |
| $CO_3$ | % | 18.7 | |
| CIL Residue | g/t | | 2.56 |
| Au Recovery by CIL | % | | 55 |

Example 2

Acid POX, Flotation, CIL

The same POX discharge used in Example 1 was treated using a two-stage flotation process consisting of a rougher and cleaner flotation, wherein a portion of the preg-robbing TCM is concentrated, as shown in FIGS. 1A and B. The discharged autoclave slurry was ground for about five minutes to remove oxidative film from particle surfaces. Prior to flotation, there was no pH adjustment of the autoclave discharge, and the pulp density was about 20%. The material was then conditioned with about 200 g/t of Cytec C-40 as a dispersant. About 100 g/t of Cytec carbon collector S19979/S10037 or fuel oil was added. Rougher flotation was performed in a standard 5 litre flotation cell. Rougher concentrate was collected and ground for about 4 minutes followed by one stage of cleaning. The TCM-containing concentrate was collected. The Rougher and Cleaner Tails were collected and CIL tests were carried out on this stream.

Flotation and CIL test results on acid POX residue are shown in Table 2:

| | | Unit | Head | Rougher Tails | Cleaner Tails | Cleaner (TCM) Conc. |
|---|---|---|---|---|---|---|
| Assay | Au | g/t | 4.5 | 3.3 | 25.8 | 51.7 |
| | Sulfide | % | 0.06 | 0.05 | 0.14 | 0.47 |
| | TCM | % | 0.49 | 0.28 | 4.28 | 7.86 |
| | Mass | % | 100 | 95.2 | 4.26 | 0.55 |
| Flotation Recovery | Au | % | | 69.3 | 24.4 | 6.3 |
| | Sulfide | % | | 84.8 | 10.6 | 4.6 |
| | TCM | % | | 53.8 | 37.3 | 8.90 |
| CIL | Recovery Fraction | % | | 85.2 | 64 | |
| | CIL | g/t | | 0.49 | 11.22 | |
| | Recovery Head | % | | 59.1 | 15.6 | |
| | Total (CIL Tails) | % | | 74.7 | | |

Table 2 shows that the removal of TCM from POX discharge resulted in significant improvement in overall CIL recovery to about 75.0%. This increase in recovery from 55% (without flotation as shown in Table 1) to about 75% with flotation could be attributed to removal of some preg-robbing TCM from POX residue. The TCM concentrate contains about 6.3% of the total gold. Recovery of this gold from the TCM concentrate provides an opportunity to increase gold recovery even further in addition to the 75% gold recovery obtained from flotation tails.

Example 3

Alkaline POX, CIL

The same gold bearing sulfide as used in example 1 was ground to $P_{80}$ less than 70 microns. The ore is treated by alkaline pressure oxidation, at 225° C. with oxygen over pressure of 100 psi, a pulp density of 35% and a residence time of 1 hour. The percent oxidation was lower than that observed for Acidic Pressure Oxidation in example 1 and the residue discharged from the autoclave contains 0.06 sulfide.

The pH of the slurry was adjusted to greater than 10.5 and gold recovery was performed using CIL. Treatment of the discharge by conventional CIL yields a gold recovery of 52%. The low gold recovery is due to the preg-robbing character imparted by a portion of the TCM material. The feed assays and CIL recoveries are summarized in Table 3.

TABLE 3

| Elements | | Head Assay BR31 | Alkaline POX Discharge |
|---|---|---|---|
| Au | g/t | 4.53 | 4.6 |
| S (T) | % | 1.76 | |
| $S^{2-}$ | % | 1.70 | 0.06 |
| $S(SO_4)$ | % | | |
| TCM | % | 0.46 | 0.49 |
| $CO_3$ | % | 18.4 | |
| CIL Residue | g/t | | 2.4 to 2.9 |
| Au Recovery by CIL | % | | 42-52 |

Example 4

Alkaline POX, Flotation, CIL

Figure 1B:
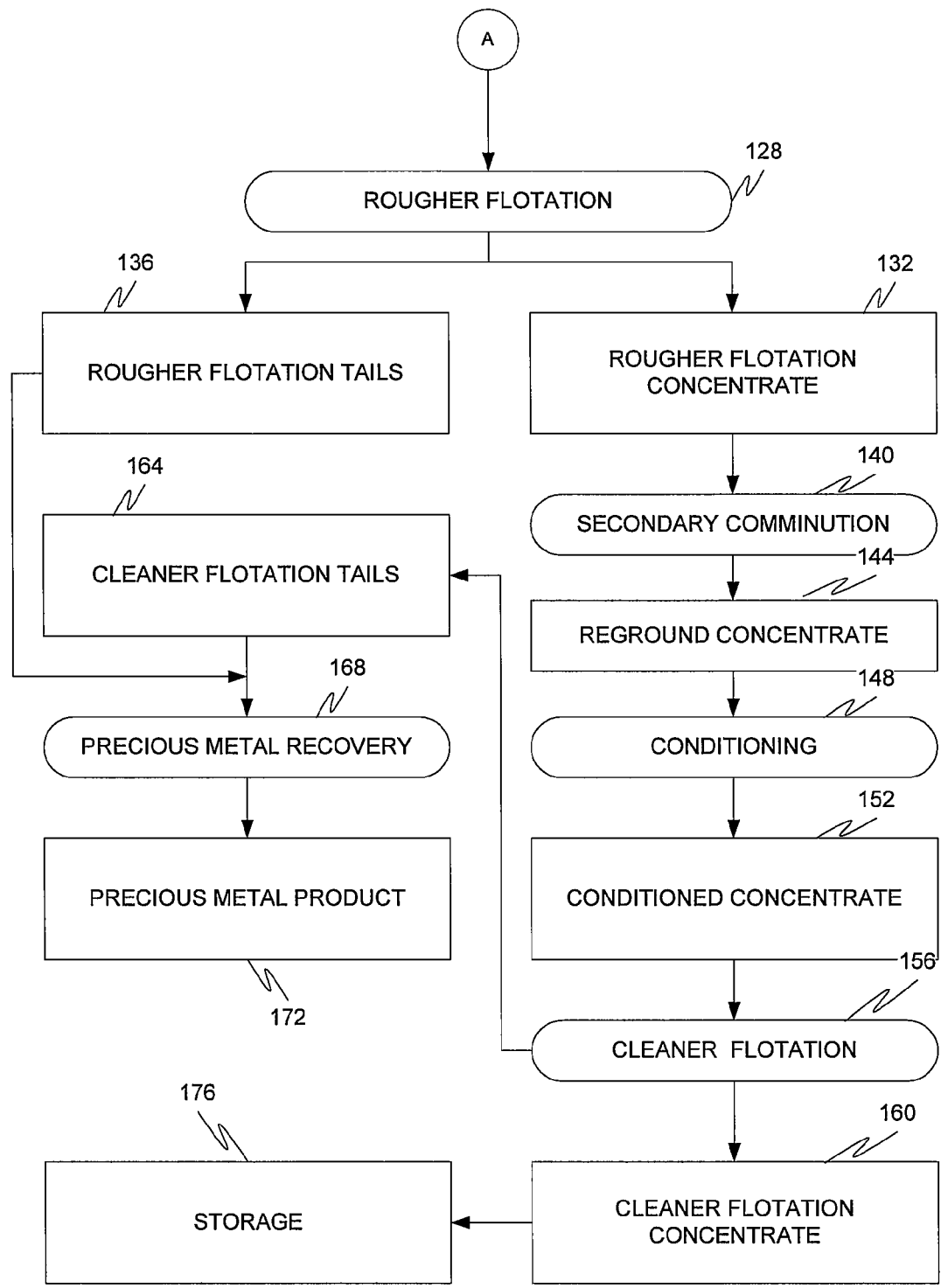

The same POX discharge used in Example 3 was treated using a two-stage flotation process consisting of rougher and cleaner flotation circuits, wherein a portion of the preg-robbing TCM is concentrated, as shown in FIGS. 1A and 1B. The discharged autoclave slurry was first washed, filtered and then ground in a ball mill for about five minutes to remove oxidative film from particle surfaces. Prior to flotation, there was no pH adjustment of the autoclave discharge, and the pulp density was about 20 to 30% by weight. About 200 g/t of Cytec dispersant C-40 was added to disperse the fine TCM and other particles. In addition, about 200 g/t of pyrite depressant SD200 was added to the slurry. About 100 g/t of carbon collector S19979/S10037 and or fuel oil were added in stages. About 100 g/t of MIBC frother was also added. Rougher flotation was carried out in a standard 5 litre Denver flotation cell. The rougher concentrate was ground to about 4 minutes and then subjected to two stages of cleaning to depress the liberated gangue and sulfides from TCM. CIL tests were carried out on the rougher tails and the combined $1^{st}$ and $2^{nd}$ cleaner tails.

Flotation and CIL test results on alkaline POX residue are shown in Table 4:

|   |   | Unit | Head | Rougher Tails | $1^{st}$/2nd Cleaner Tails | Cleaner (TCM) Conc. |
|---|---|---|---|---|---|---|
| Assay | Au | g/t | 4.98 | 3.55 | 8.6/11.6 | 14.4 |
|  | Sulfide | % | 0.5 | 0.63 | 0.12/0.27 | 0.09 |
|  | TCM | % | 0.48 | 0.38 | 0.78/0.89 | 0.95 |
|  | Mass | % | 100 | 75.3 | 20.6/2.60 | 1.60 |
| Flotation Recovery | Au | % |  | 53.7 | 35.6/6.0 | 4.6 |
|  | Sulfide | % |  | 93.4 | 4.9/1.4 | 0.3 |
|  | TCM | % |  | 58.7 | 33.4/4.8 | 3.2 |
| CIL | Recovery Fraction | % |  | 71.9 | 89/91.1 |  |
|  | CIL | g/t |  | 0.97 | 0.91/0.99 |  |
|  | Recovery Head | % |  | 38.6 | 31.7/5.5 |  |
|  | Total (CIL Tails) | % |  |  | 75.8 |  |

Table 4 shows that the removal of TCM from POX discharge resulted in significant improvement in overall CIL recovery to about 76.0%. This increase in recovery from about 47% on average (without flotation as shown in Table 3) to about 76% with flotation could be attributed to removal of some preg-robbing TCM from POX residue. The TCM concentrate contains about 4.6% of the total gold. Recovery of this gold from the TCM concentrate provides an opportunity to increase gold recovery even further in addition to the 76% gold recovery obtained from flotation tails.

Example 5

Alkaline POX, Flotation, CIL

A new gold bearing sulfide ore (BR31 new) is ground to $P_{80}$ less than 70 microns. The POX-CIL recovery was similar to that shown in Table 3. The POX discharge was treated using a two stage flotation process consisting of rougher and cleaner flotation circuits, wherein a portion of the preg-robbing TCM is concentrated, as shown in FIGS. 1A and 1B. The discharged autoclave slurry was not washed and filtered as carried out in example 3. The slurry was then ground in a ball mill for about five minutes to remove oxidative film from particle surfaces. Prior to flotation, there was no pH adjustment of the autoclave discharge, and the pulp density was about 20 to 30% by weight. About 300 g/t of fuel oil was added as a collector for TCM flotation. In addition, about 300 g/t of Cytec collector S10146 was added in stages. About 30 g/t of MIBC frother was also added. Rougher flotation was carried out in a standard 5 litre Denver flotation cell. The rougher concentrate was ground to about 4 minutes and then subjected to two stages of cleaning to depress the liberated gangue and sulfides from TCM. CIL tests were carried out on the rougher tails and the combined $1^{st}$ and $2^{nd}$ cleaner tails.

Flotation and CIL test results on alkaline POX residue are shown in Table 5:

|   |   | Unit | Head | Rougher Tails | $1^{st}/2^{nd}$ Cleaner Tails | $2^{nd}$ Cleaner (TCM) Conc. |
|---|---|---|---|---|---|---|
| Assay | Au | g/t | 4.93 | 3.34 | 9.8/12.6 | 15.0 |
|  | Sulfide | % | 0.36 | 0.45 | 0.07/<0.05 | <0.05 |
|  | TCM | % | 0.53 | 0.42 | 0.90/1.03 | 1.15 |
|  | Mass | % | 100 | 77.9 | 17.0/4.30 | 0.8 |
| Flotation Recovery | Au | % |  | 52.8 | 33.7/11.0 | 2.6 |
|  | Sulfide | % |  | 96.0 | 3.3/0.60 | 0.10 |
|  | TCM | % |  | 61.2 | 28.6/8.3 | 1.8 |
| CIL | Recovery Fraction | % |  | 72.8 | 90.6/93.9 |  |
|  | CIL | g/t |  | 0.96 | 0.92/0.79 |  |
|  | Recovery Head | % |  | 38.4 | 30.5/10.3 |  |
|  | Total (CIL Tails) | % |  |  | 79.2 |  |

Table 5 shows that the removal of TCM from POX discharge resulted in significant improvement in overall CIL recovery to about 79.0%. This increase in recovery from about 47% on average (without flotation as shown in Table 3) to about 79% with flotation could be attributed to removal of some preg-robbing TCM from POX residue. The TCM concentrate contains about 2.6% of the total gold. Recovery of this gold from the TCM concentrate provides an opportunity to increase gold recovery even further in addition to the 79% gold recovery obtained from flotation tails.

A number of variations and modifications of the invention can be used. It would be possible to provide for some features of the invention without providing others. The present invention, in various embodiments, configurations, or aspects, includes components, methods, processes, systems and/or apparatus substantially as depicted and described herein, including various embodiments, configurations, aspects, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) providing a feed material comprising a precious metal, at least about 0.1 wt. % sulfide sulfur, and 0.3 to about 10 wt. % carbonaceous materials;
   (b) oxidizing at least a portion of the sulfide sulfur in the feed material to provide an oxidized material, wherein at least most of the gold and/or silver and carbonaceous materials remain in the oxidized feed material;
   (c) comminuting the oxidized material to remove, at least partially, an oxidative film on at least some particles of the oxidized feed material;
   (d) after step (b), floating the comminuted and oxidized feed material to separate the material into a first fraction comprising at least most of the gold and/or silver and a second fraction comprising at least about 25 wt. % of the carbonaceous materials in the feed material, wherein the comminuted and oxidized feed material is free of precious metal leaching prior to the floating step;
   (e) comminuting the second fraction to provide a comminuted second fraction;
   (f) floating the comminuted second fraction to form cleaner tails comprising most of the gold and/or silver in the comminuted second fraction and a cleaner concentrate comprising most of the carbonaceous material in the comminuted second fraction; and
   (g) after floating is completed, thereafter recovering the gold and/or silver from the first fraction and the cleaner tails, wherein the first fraction and the cleaner tails comprise at least about 90% of the gold and/or silver in the oxidized material.

2. The method of claim 1, further comprising:
   (f) conditioning the comminuted and oxidized material by contacting the comminuted and oxidized material with a collector that renders the carbonaceous material more hydrophobic, wherein the conditioned comminuted and oxidized material is subjected to flotation in step (d).

3. The method of claim 2, wherein at least one of a sulfide depressant and carbonaceous material activator is contacted with the comminuted and oxidized material during conditioning.

4. The method of claim 2, further comprising:
   conditioning the comminuted second fraction by contacting the comminuted second fraction with the collector that renders the carbonaceous material more hydrophobic.

5. A method, comprising:
   (a) providing a feed material comprising a precious metal, at least about 0.1 wt. % sulfide sulfur, and 0.3 to about 10 wt. % carbonaceous materials;
   (b) pressure oxidizing at least a portion of the sulfide sulfur in the feed material to provide an oxidized material, wherein at least most of the gold and/or silver and carbonaceous materials remain in the oxidized feed material; and
   (c) after step (b) floating the oxidized feed material to separate the material into a first fraction comprising at least about 70 wt. % of the gold and/or silver in the oxidized feed material and a second fraction comprising no less than about 40 wt. % of the carbonaceous materials in the feed material;
   (d) comminuting the second fraction to provide a comminuted second fraction; and
   (e) floating the comminuted second fraction to form cleaner tails comprising most of the gold and/or silver in the comminuted second fraction and a cleaner concentrate comprising most of the carbonaceous material in the comminuted second fraction, wherein the first fraction and the cleaner tails comprise at least about 90% of the gold and/or silver in the oxidized material.

6. The method of claim 5, further comprising:
   after step (c) comminuting the oxidized material to remove, at least partially, an oxidative film on at least some particles of the oxidized material, wherein the comminuted and oxidized material is subjected to flotation in step (c).

7. The method of claim 6, further comprising:
after comminuting the oxidized material, conditioning the comminuted and oxidized material by contacting the comminuted and oxidized material with a collector that renders the carbonaceous material more hydrophobic, wherein the conditioned comminuted and oxidized material is subjected to flotation in step (c).

8. The method of claim 7, wherein at least one of a sulfide depressant and carbonaceous material activator is contacted with the comminuted and oxidized material during conditioning.

9. The method of claim 7, wherein the first fraction is a rougher concentrate and the second fraction is a rougher tails and further comprising:
(f) comminuting the second fraction to provide a comminuted second fraction;
(g) conditioning the comminuted second fraction by contacting the comminuted second fraction with the collector; and
(h) floating the comminuted second fraction to form a third fraction comprising most of the gold and/or silver in the second fraction and a fourth fraction comprising most of the carbonaceous material in the second fraction.

10. The method of claim 9, wherein the oxidized feed material, prior to the floating step, is free of precious metal leaching and further comprising:
recovering gold and/or silver from the first and third fractions.

11. The method of claim 5, wherein the oxidized feed material is free of precious metal leaching before the floating step.

12. A method, comprising:
(a) providing a feed material comprising a precious metal, at least about 0.1 wt. % sulfide sulfur, and 0.3 to about 10 wt. % carbonaceous materials;
(b) pressure oxidizing at least a portion of the sulfide sulfur in the feed material to provide an oxidized material, wherein at least most of the gold and/or silver and carbonaceous materials remain in the oxidized feed material; and
(c) thereafter floating the oxidized feed material to separate the material into a first fraction comprising at least most of the gold and/or silver and a second fraction comprising at least about 25 wt. % of the carbonaceous materials in the feed material;
(d) comminuting the second fraction to provide a comminuted second fraction; and
(e) floating the comminuted second fraction to form cleaner concentrate comprising most of the gold and/or silver in the comminuted second fraction and a cleaner tails comprising most of the carbonaceous material in the comminuted second fraction, wherein the first fraction and the cleaner concentrate comprise at least about 90% of the gold and/or silver in the oxidized material.

13. The method of claim 12, further comprising:
comminuting the oxidized material to remove, at least partially, an oxidative film on at least some particles of the oxidized material, wherein the comminuted and oxidized material is subjected to flotation in step (c).

14. The method of claim 13, further comprising:
after the comminuting the oxidized material, conditioning the comminuted and oxidized material by contacting the comminuted and oxidized material with a collector that renders the carbonaceous material more hydrophilic, wherein the conditioned comminuted and oxidized material is subjected to flotation in step (c).

15. The method of claim 14, wherein at least one of a carbon depressant and sulfide activator is contacted with the comminuted and oxidized material during conditioning.

16. The method of claim 14, further comprising:
(f) comminuting the second fraction to provide a comminuted second fraction;
(g) conditioning the comminuted second fraction by contacting the comminuted second fraction with the collector; and
(h) floating the comminuted second fraction to form a fourth fraction comprising most of the gold and/or silver in the second fraction and a third fraction comprising most of the carbonaceous material in the second fraction.

17. The method of claim 16, further comprising:
recovering gold and/or silver from the first fraction and the fourth fractions.

* * * * *